United States Patent
Schwarz

(10) Patent No.: US 9,872,507 B2
(45) Date of Patent: Jan. 23, 2018

(54) DEVICE AND METHOD FOR REMOVING A SURFACE LAYER INCLUDING THE SKIN FROM FISH FILLETS

(71) Applicant: NORDISCHER MASCHINENBAU RUD. BAADER GMBH + CO. KG, Lübeck (DE)

(72) Inventor: Olaf Schwarz, Wismar (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 15/301,349

(22) PCT Filed: Mar. 16, 2015

(86) PCT No.: PCT/EP2015/055422
§ 371 (c)(1),
(2) Date: Sep. 30, 2016

(87) PCT Pub. No.: WO2015/150061
PCT Pub. Date: Oct. 8, 2015

(65) Prior Publication Data
US 2017/0112153 A1    Apr. 27, 2017

(30) Foreign Application Priority Data
Apr. 3, 2014 (DE) .................. 10 2014 104 771

(51) Int. Cl.
*A22C 25/00* (2006.01)
*A22C 25/17* (2006.01)
*A22C 25/08* (2006.01)

(52) U.S. Cl.
CPC .............. *A22C 25/17* (2013.01); *A22C 25/08* (2013.01)

(58) Field of Classification Search
CPC ......... A22C 25/17; A22C 25/00; A22C 25/18; A22C 25/08
(Continued)

(56) References Cited

U.S. PATENT DOCUMENTS 3,739,428 A * 6/1973 Bartels ................... A22C 25/17
                                                                    452/127
4,203,179 A * 5/1980 Braeger ................. A22C 25/17
                                                                    452/127
(Continued)

FOREIGN PATENT DOCUMENTS

DE        4329380 C1    1/1995
DE   102005047752 B3   10/2006
(Continued)

OTHER PUBLICATIONS

International Preliminary Report on Patentability dated Oct. 4, 2016 from International Patent Application No. PCT/EP2015/055422 filed Mar. 16, 2015.
(Continued)

*Primary Examiner* — Richard Price, Jr.
(74) *Attorney, Agent, or Firm* — Sunstone IP

(57) ABSTRACT

The invention relates to an apparatus for removing a surface layer including the skin from fish fillets, comprising a feeding device, a dispatching device and a separating arrangement having a driver roller, which is rotationally driven, and a main blade arranged in the region of the driver roller for removing the surface layer, wherein the main blade is arranged at a distance from the driver roller to form a cutting gap (S) and is designed to be deflectable relative to the driver roller, wherein the apparatus has a measuring arrangement, comprising at least one detection element which is designed and configured to determine size-relevant data of the fish fillets, and an evaluation and control unit, the evaluation and control unit being connected by means of
(Continued)

signal lines to the detection element and to the main blade for automatically controlling the size of the cutting gap between the main blade and the driver roller depending on the previously determined fish fillet size.

12 Claims, 4 Drawing Sheets

(58) Field of Classification Search
USPC .................................. 452/125, 127–130, 132
See application file for complete search history.

(56) References Cited

U.S. PATENT DOCUMENTS

| | | | | |
|---|---|---|---|---|
| 4,730,368 | A | * | 3/1988 | Townsend ............... A22C 17/12 |
| | | | | 452/127 |
| 4,947,517 | A | | 8/1990 | Boekel |
| 5,236,323 | A | | 8/1993 | Long et al. |
| 5,288,264 | A | * | 2/1994 | Braeger ................. A22C 25/17 |
| | | | | 452/127 |
| 5,766,066 | A | * | 6/1998 | Ranniger ................ A22B 5/166 |
| | | | | 452/125 |
| 5,938,518 | A | | 8/1999 | Bargele et al. |
| 6,659,856 | B2 | * | 12/2003 | Long ...................... A22C 17/12 |
| | | | | 452/127 |
| 7,857,686 | B2 | | 12/2010 | Amason |
| 8,197,311 | B2 | * | 6/2012 | Schwarz ................ A22B 5/166 |
| | | | | 452/127 |
| 8,387,522 | B2 | | 3/2013 | Rusko et al. |
| 2007/0293132 | A1 | | 12/2007 | Amason |
| 2008/0245243 | A1 | | 10/2008 | Rusko et al. |
| 2011/0124277 | A1 | | 5/2011 | Schwarz |
| 2012/0192695 | A1 | | 8/2012 | Schroeder et al. |
| 2015/0216192 | A1 | | 8/2015 | Jacobsen et al. |

FOREIGN PATENT DOCUMENTS

| | | |
|---|---|---|
| DE | 102012107278 A1 | 2/2014 |
| EP | 0324522 A1 | 7/1989 |
| EP | 1830656 B1 | 6/2010 |
| WO | 2009021672 A1 | 2/2009 |
| WO | 2013164861 A1 | 11/2013 |

OTHER PUBLICATIONS

International Search Report dated Sep. 29, 2015 from International Patent Application No. PCT/EP2015/055422 filed Mar. 16, 2015.

* cited by examiner

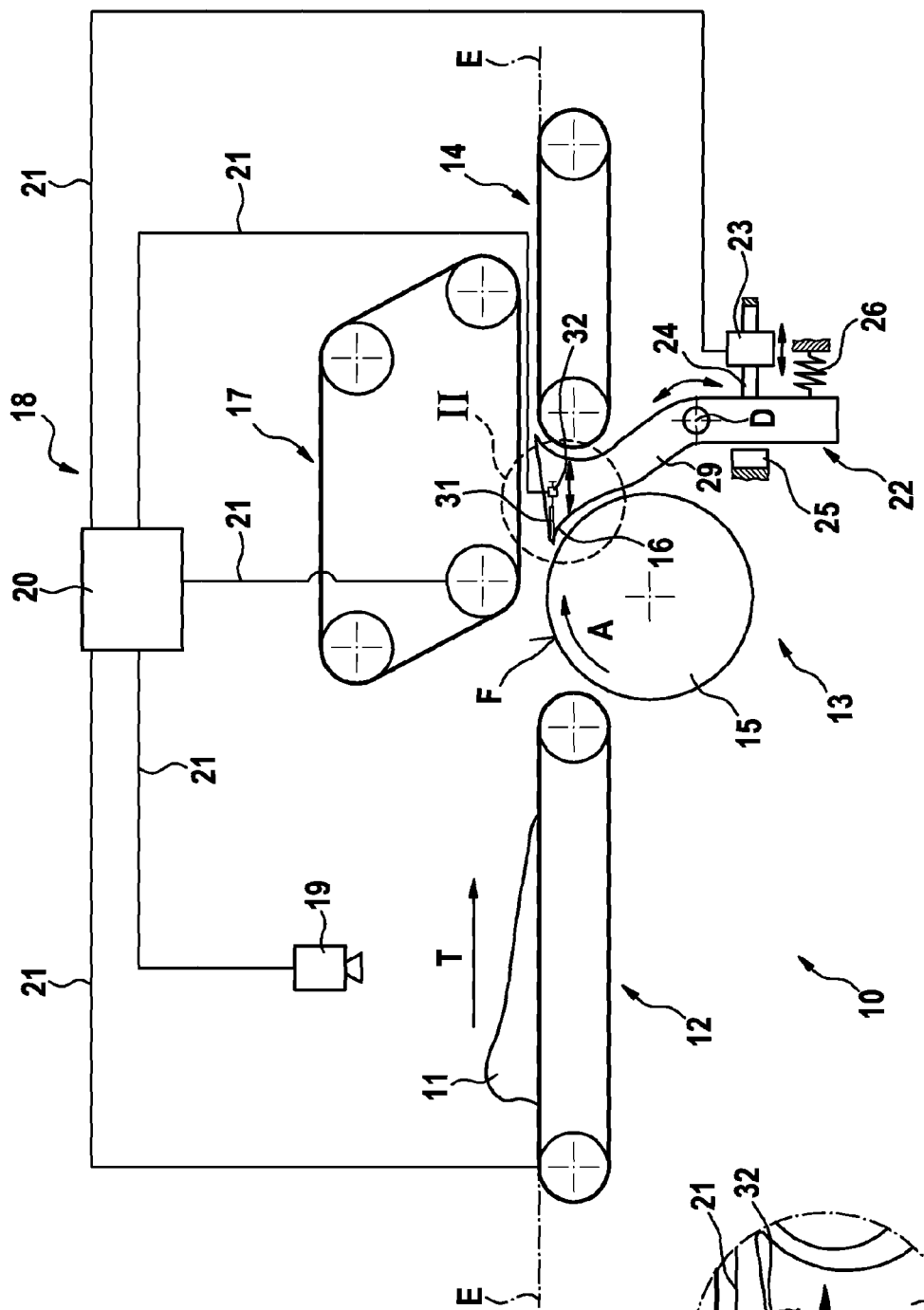
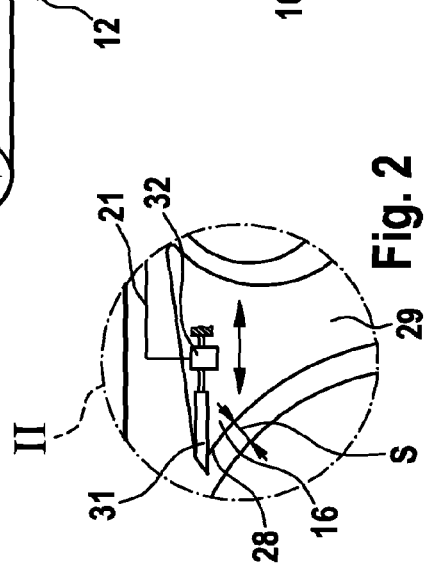

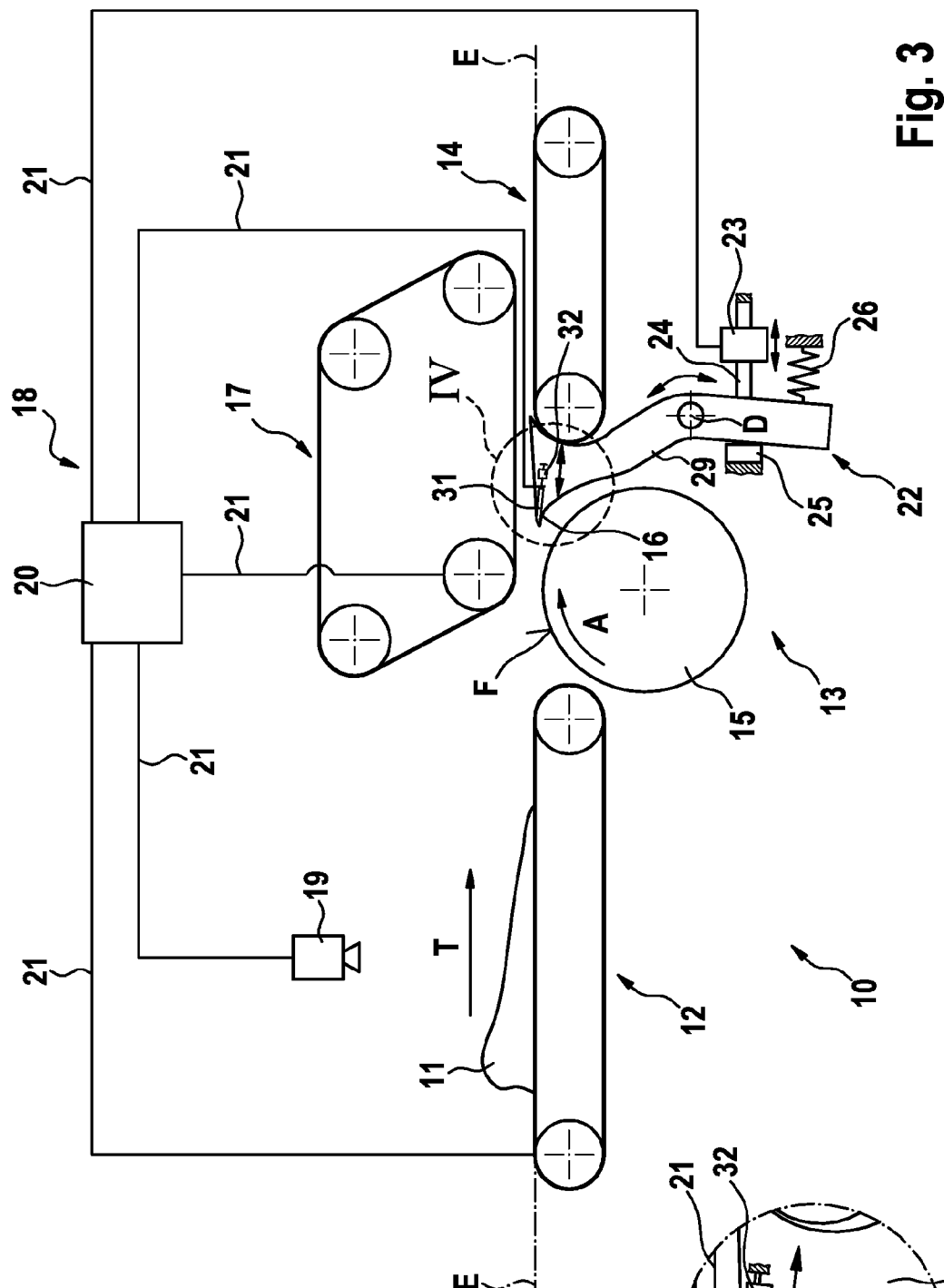
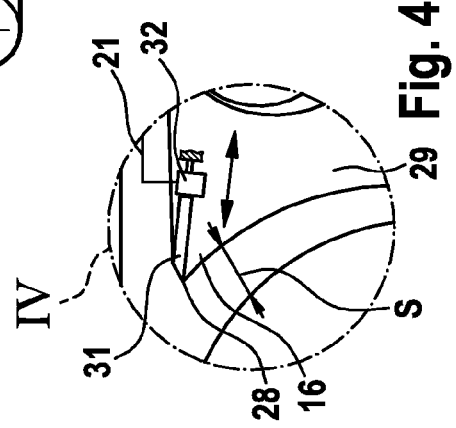

DEVICE AND METHOD FOR REMOVING A SURFACE LAYER INCLUDING THE SKIN FROM FISH FILLETS

CROSS-REFERENCE TO RELATED APPLICATIONS

This application is a National Stage Application of PCT/EP2015/055422, filed Mar. 16, 2015, which designates the United States and claims the priority of German patent application DE 10 2014 104 771.0 filed on Apr. 3, 2014, the subject matter of which is incorporated herein by reference.

BACKGROUND OF THE INVENTION

The invention relates to an apparatus for removing a surface layer including the skin from fish fillets, comprising a feeding device for feeding the fish fillets lying skin side down tail end first in transport direction T in the region of a separating arrangement, a dispatching device for dispatching the fish fillets freed from the surface layer and the separating arrangement, the separating arrangement comprising a rotationally driven driver roller arranged downstream of the feeding device and upstream of the dispatching device in the transport direction T of the fish fillets, said driver roller having a drive direction A synchronous with the transport direction T, a main blade arranged in the region of the driver roller for removing the surface layer and a pressing element active in the region of the main blade for pressing the fish fillets onto the textured conveying surface of the driver roller, wherein the main blade is arranged at a distance from the driver roller to form a cutting gap S and is designed to be deflectable relative to the driver roller.

Furthermore, the invention relates to a method for removing a surface layer including the skin from fish fillets, comprising the steps: feeding of the fish fillets lying skin side down tail end first in transport direction T by a feeding device in the region of a separating arrangement, removal of the surface layer of the fish fillets from the same by the separating arrangement, in that the fish fillets are fed lying flat between a rotationally driven driver roller and a pressing element to a main blade, the removed surface layer being dispatched downwards by way of a cutting gap S formed between the main blade and the driver roller while the fish fillet freed from the surface layer is transferred to a dispatching device, and dispatching of the fish fillets freed from the surface layer by the dispatching device.

Such apparatuses and methods are used in the fish processing industry to free fish fillets from a surface layer including the skin. In other words, said apparatus and the associated method are used to remove the layer of skin (with or without silver skin) from the fish fillets which lie skin side down on the feeding device and are transported tail end first. To do this, the feeding device and the dispatching device are arranged in the conveying (transport) plane at a distance from one another. Between the feeding device and the dispatching device, the cylindrical driver roller, which is also referred to as a skinning roller, is arranged in such a manner that the peak of the driver roller lies approximately in the conveying (transport) plane defined by the feeding device and the dispatching device. When the fish fillets arrive in the region of the driver roller, this roller pulls the fish fillets from the feeding device due to its rotational drive while the feeding device, due to its drive, continues to "push" the fish fillet. On the driver roller, the fish fillet is clamped between the driver roller and the pressing element which is usually arranged above the driver roller or it is pressed onto the textured conveying surface of the driver roller and thus transported further in the direction of the separating arrangement. The fish fillet strikes the main blade with its tail-end front face, said main blade being arranged at a distance from the driver roller to form the cutting gap S. As a result, the main blade inserts into the fish fillet between the skin and the fillet itself. The layer of skin facing downwards is dispatched downwards in the cutting gap S by the driver roller while the fish fillet freed from the skin is transported away onto the dispatching device above the main blade.

Selection of the driver roller, particularly regarding the number of teeth, and adjusting the size of the cutting gap S depend heavily on the size of the fish fillets to be processed. Different combinations of main blade and driver roller are therefore used with different sizes of fish fillet. In the known apparatuses, a large cutting gap S is required for large (and therefore also thick) fish fillets while a small cutting gap S is required for small (and therefore thin) fish fillets. There are other average cutting gap sizes between them. The size of the cutting gap S must be adjusted to the corresponding size of the fish fillet to be processed prior to processing of the fish fillets. This requires increased adjustment effort and also depends on the experience of the operator. Furthermore, for skinning larger/thicker fish fillets, a driver roller with a lower number of teeth is used, in particular to facilitate insertion of the tail end into the cutting gap S, while a driver roller with a higher number of teeth is used for skinning smaller/thinner fish fillets. This requires additional conversion effort which results in downtimes and therefore loss of production. In addition, with said apparatus and a chosen combination of main blade and driver roller, it is also only possible to achieve optimum cutting results for a certain size range of fish fillets which makes pre-sorting of the fish fillets necessary.

SUMMARY OF THE INVENTION

Thus the object of the invention is to create a simple and easy to handle apparatus for skinning fish fillets of different sizes. The object is further to propose a corresponding method.

This object is achieved by an apparatus having the features referred to hereinbefore in that the apparatus has a measuring arrangement, the measuring arrangement comprising at least one detection element, which is arranged in the region of the feeding device and is designed and configured to determine size-relevant data of the fish fillets, and an evaluation and control unit, the evaluation and control unit being connected by signal lines to the or to each detection element and to the main blade for controlling the size of the cutting gap S between the main blade and the driver roller depending on the previously determined fish fillet size. In a simple and reliable manner, this embodiment according to the invention enables the size of the cutting gap required in each case for an optimum removal process to be individually adjusted automatically and while the production process is running. By individually adjusting the size of the cutting gap in line with the fish fillet size in each case, a driver roller can be used which is independent of the fish fillet size with the result that it is possible to dispense with time-consuming replacement of the driver roller.

A particularly expedient development of the invention is characterised in that the main blade is arranged on a pivot mechanism which is designed to be pivotable about a pivot point D for changing the size of the cutting gap S, wherein an adjusting drive for executing the pivoting movement, two abutments for limiting the pivoting movement in both pivoting directions, and a retaining element, whose retaining force acts counter to the activation direction of the adjusting drive, are assigned to the pivot mechanism, and in that the adjusting drive is connected to the evaluation and control unit by a signal line. This development supports fast and accurate adjustment of the separating arrangement to the fish fillet size to be processed in each case. The retaining element basically attempts to move the pivot mechanism towards the driver roller, so as to form a small cutting gap S. The adjusting drive can work against the retaining force to effect enlargement of the cutting gap. Both movements are each limited by an abutment in such a way that, on the one hand, the pivot mechanism with the main blade cannot be moved against the driver roller and, on the other hand, it cannot be moved against the dispatching device. By connecting the adjusting drive to the evaluation and control unit, the pivot mechanism and therefore the main blade can be adjusted virtually on-line, depending on the previously determined fish fillet size, to the desired distance from the driver roller with an optimum cutting gap.

Advantageously, the main blade is firmly connected to the pivot mechanism and is pivotable therewith about the pivot point D, and a secondary blade, which is movable relative to the main blade, is assigned to the main blade for incising the surface layer, wherein an adjusting drive, which is connected to the evaluation and control unit by a signal line, is assigned to the secondary blade for executing the incision movement depending on the previously determined fish fillet size. This secondary blade is movable outwards beyond the main blade contrary to the transport direction T such that the fish fillet initially strikes the secondary blade with the tail side end and then said secondary blade assists and optimises incising of the fish fillet. By connecting the adjusting drive for the secondary blade to the evaluation and control unit, with large fillets the secondary blade can remain in the fish fillet longer in the cutting (working) position, that is to say protruding beyond the main blade, in order to achieve a longer or deeper incision, while with small fish fillets the secondary blade can be retracted sooner, that is to say immediately after the incision. Thus, individually optimised cutting guidance is achieved which leads to measurable quality improvements in skinning.

An especially preferred embodiment of the invention is characterised in that a drive means is assigned to the feeding device, said drive means being connected to the evaluation and control unit by a signal line for transmitting the transport speed of the fish fillet in transport direction T. As a result, the exact setting of the main blade and/or the secondary blade can be further optimised since, knowing the size of the fish fillet and the transport speed with which the fish fillet is transported towards the separating arrangement, the precise "arrival time" of each fish fillet at the cutting gap S is known and can be used for controlling the main blade and/or the secondary blade.

An advantageous development of the invention is characterised in that an adjusting drive, which is connected to the evaluation and control unit by a signal line, is assigned to the pressing element to adjust the distance from the driver roller depending on the previously determined fish fillet size. This allows the optimum pressure to be exerted on the fish fillet, which pressure is just great enough so that, on the one hand, skinning is still just possible and, on the other hand, only minimal load is placed on the fish fillet.

Expediently, the adjusting drives can be activated and/or controlled independently of each other by the evaluation and control unit. As a result, a particularly individual cutting guidance with an optimised removal process can be implemented since individually and automatically overlayable incision and separating movements of the main blade and/or the secondary blade can be executed for each individual fish fillet.

The object is also achieved by a method having the steps referred to hereinbefore in that the size of the fish fillets to be processed is determined in the region of the feeding device and the size of the cutting gap S between the main blade and the driver roller is automatically adjusted depending on the previously determined fish fillet size. The advantages arising from this have already been described in connection with the apparatus according to the invention, which is why reference will be made to the relevant passages to avoid repetitions.

The fish fillets are preferably incised by a secondary blade before impinging on the main blade, wherein the incision, that is the length or depth of the incision, is automatically adjusted by the secondary blade depending on the previously determined fish fillet size.

In a preferred development of the method, an evaluation and control unit controls the size of the cutting gap S and the position of the secondary blade relative to the main blade depending on the previously determined fish fillet size and the transport speed of the fish fillets.

Advantageously, the distance of the pressing element to the driver roller is automatically adjusted depending on the previously determined fish fillet size. As a result, the load on the fish fillet is reduced to the necessary minimum.

The method according to the invention is especially preferably developed in that the individual adjusting movements for changing the size of the cutting gap S and/or for relative movement of the secondary blade with respect to the main blade and/or for changing the distance between the pressing element and the driver roller can be performed independently of each other.

The other advantages arising from the previously described process steps, which develop the method according to the invention, have likewise been described in conjunction with the apparatus which is why reference will be made to the corresponding passages in the text.

BRIEF DESCRIPTION OF THE DRAWINGS

Further expedient and/or advantageous features and developments as well as process steps of the invention emerge from the dependent claims and the description. An especially preferred embodiment of the invention is explained in greater detail with reference to the attached drawing. The drawing shows:

FIG. 1 a schematic diagram of the apparatus according to the invention with a first position of the main blade (small gap) and a secondary blade in an advanced first cutting position, FIG. 2 the enlarged region II of the separating arrangement of the apparatus according to FIG. 1, FIG. 3 a schematic diagram of the apparatus according to the invention with a second position of the main blade (large gap) and a secondary blade in a retracted waiting position, FIG. 4 the enlarged region IV of the separating arrangement of the apparatus according to FIG. 3, FIG. 5 an enlarged diagram of the pivot mechanism with main and secondary blade, and FIG. 6 a simplified diagram of the apparatus in a perspective view.

BRIEF DESCRIPTION OF THE EMBODIMENTS

Figure 5:
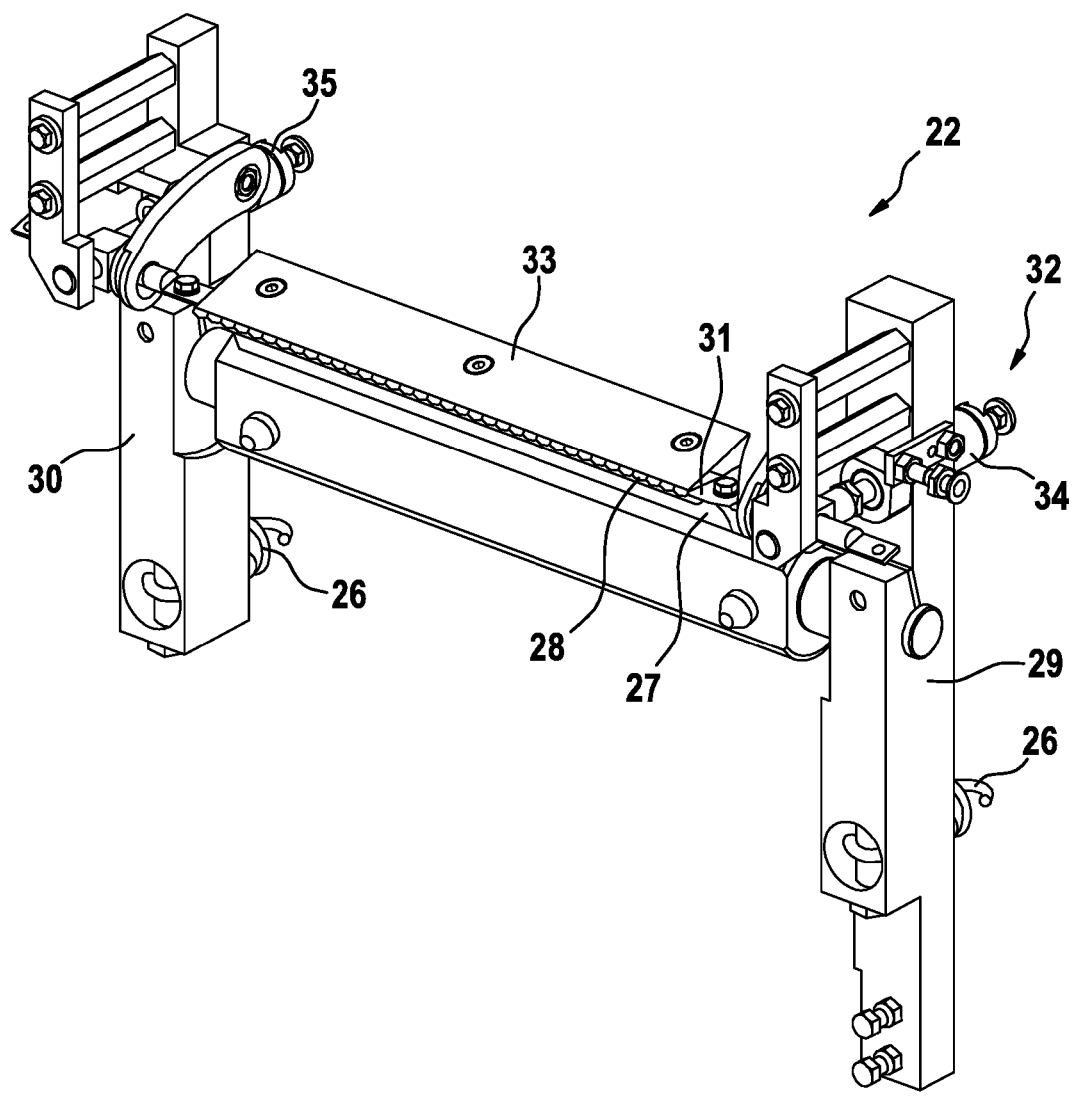
Figure 6:
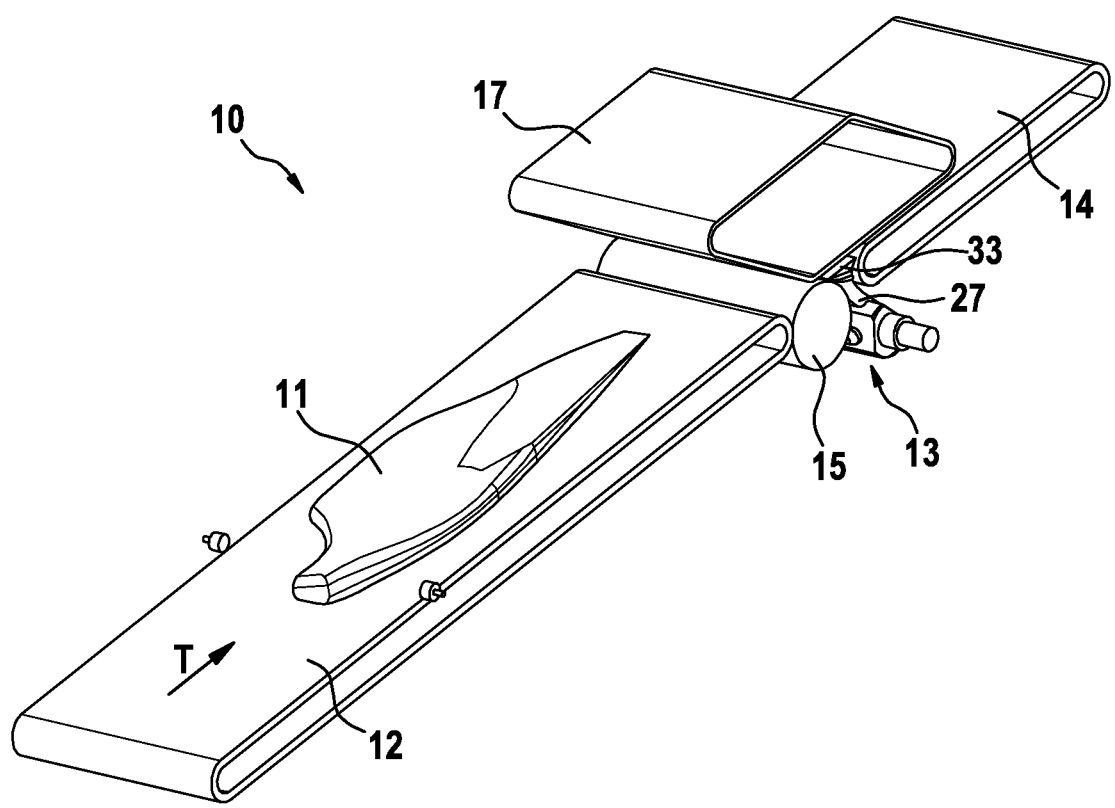

The apparatus illustrated in the drawing is used for skinning fish fillets. However, other surface layers, e.g. a fat layer or similar, can also be removed from fish fillets or comparable products with the apparatus or the method according to the invention.

FIG. 1 illustrates schematically an apparatus 10 for removing a surface layer including the skin from fish fillets 11. The apparatus 10 comprises a feeding device 12 for feeding of the fish fillets 11 lying skin side down tail end first in transport direction T in the region of a separating arrangement 13, a dispatching device 14 for dispatching the fish fillets 11 freed from the surface layer, and the separating arrangement 13. The separating arrangement 13 comprises a driver roller 15, which is rotationally driven, arranged downstream of the feeding device 12 and upstream of the dispatching device 14 in the transport direction T of the fish fillets 11, said driver roller having a drive direction A synchronous with the transport direction T. This means that the driver roller 15 is driven in the clockwise direction by drive means not shown in the view according to FIG. 1 such that the fish fillets 11 are further transportable by the driver roller 15 towards the dispatching device 14 in transport direction T. Furthermore, the separating arrangement 13 comprises a main blade 16 arranged in the region of the driver roller 15 for removing the surface layer and a pressing element 17 active in the region of the main blade 16 for pressing the fish fillets 11 onto the textured conveying surface F of the driver roller 15. The main blade 16 is arranged at a distance from the driver roller 15 to form a cutting gap S and is designed to be deflectable relative to the driver roller 15.

This apparatus 10 is characterised according to the invention in that the apparatus 10 has a measuring arrangement 18, the measuring arrangement 18 comprising at least one detection element 19, which is arranged in the region of the feeding device 12 and is designed and configured to determine size-relevant data of the fish fillets 11, and an evaluation and control unit 20, the evaluation and control unit 20 being connected by signal lines 21 to the or to each detection element 19 and to the main blade 16 for automatically controlling the size of the cutting gap S between the main blade 16 and the driver roller 15 depending on the previously determined fish fillet size.

In the sense of the invention, all data which are suitable for making a statement regarding the size of the fish fillets are deemed to be size-relevant data. The length, thickness and topology of the fish fillets are referred to purely by way of example. The signal lines 21 (referred to previously and in the following) describe all the usual signal-transmitting options, e.g. cables, fibre-optic cables, radio signals, etc. The signal line 21 between the evaluation and control unit 20 and the main blade 16 describes that an operative connection can be established between the evaluation and control unit 20 and the main blade 16 such that the evaluation and control unit 20 can have a direct influence on the main blade 16 and its positioning depending on the previously determined fish fillet size.

When taken on their own or in combination with each other, the features and developments described below illustrate preferred embodiments. It is expressly pointed out that features which are summarised in the claims and/or the description or are described in a common embodiment can also further develop the apparatus 10 described above in a functionally independent manner.

The driver roller 15 is preferably a cylindrical body which extends at least over part of the width, preferably however over the entire width of the feeding device 12 configured, for example, as an endless belt conveyor and dispatching device 14. The circumferential surface and therefore conveying surface F of the driver roller 15 is textured. This texture can be formed, for example, by grooves and preferably by teeth or the like. In the embodiment shown, the feeding device 12 and the dispatching device 14 lie with their transport planes E in a common plane, however, at a distance from each other within the plane in transport direction T. They may, however, also lie in different planes. The driver roller 15, which lies between the feeding device 12 and the dispatching device 14, is preferably arranged in a fixed position and mounted in such a way that the highest point of the driver roller 15 lies approximately in the transport plane E. Optionally, the position of the driver roller 15 can also be designed as adjustable. Purely by way of example, the pressing element 17 can be a spring-loaded pressure shoe which is displaceably mounted against a spring force in respect of the circumferential surface of the driver roller 15 (also referred to as the skinning roller). The pressing element 17 can also be formed—as in the embodiment shown—by a rotationally driven belt or the like.

As mentioned, the measuring arrangement 18 comprises at least one detection element 19. However, there may also be two or more than two detection elements 19 arranged in the region of the feeding device 12 in order to determine data on the size of the fish fillets 11. The or each detection element 19 can be, for example, a sensor for length measurement. In other examples, light barriers can be provided for detecting the fish fillet size. Optionally, each fish fillet 11 can also be detected and scanned by a camera. The collected information and data can then be transmitted via the or each signal line 21 of the evaluation and control unit 20. The evaluation and control unit 20 (also referred to in the following as CPU) can then draw the necessary conclusions from the data determined in order to control the main blade 16 and to bring the main blade 16 into the desired position via the signal line 21.

The main blade 16 is preferably arranged on a pivot mechanism 22 which is designed to be pivotable about a pivot point D for changing the size of the cutting gap S, wherein an adjusting drive 23 for executing the pivoting movement, two abutments 24, 25 for limiting the pivoting movement in both pivoting directions and a retaining element 26, whose retaining force acts counter to the activation direction of the adjusting drive 23, are assigned to the pivot mechanism 22. The adjusting drive 23 is connected to the evaluation and control unit 20 by a signal line 21. In the embodiment shown, the adjusting drive 23 is, for example, a pneumatic cylinder, the piston rod of which forms a first abutment 24 for the pivot mechanism 22. The pivoting movement about the pivot point D is initiated by operating the adjusting drive 23 in steps or continuously. A spring element as retaining element 26 works against the adjusting drive 23 such that the pivot mechanism 22 is pressed permanently against the abutment 24, the abutment 24 preventing the pivot mechanism 22 from colliding with the driver roller 15. Arranged on the side of the pivot mechanism 22 opposing the spring element and the adjusting drive 23 is the other abutment 25 which limits the pivoting movement in the other pivoting direction to prevent the pivot mechanism 22 from colliding with the dispatching device 14.

The solution described above merely illustrates a preferred embodiment. Optionally, the main blade 16 can also be designed to be adjustable in respect of its position and setting of the cutting gap by structurally different pivot mechanisms or by a linear drive solution, e.g. by stepping motors and longitudinal guides. Other customary adjusting components can also be used instead of the pneumatic cylinder and other known retaining components and abutment components can be used instead of the spring element.

The pivot mechanism 22 itself, used by way of example, is illustrated in detail in FIG. 5. The pivot mechanism 22 representing a structural unit comprises a knife carrier 27 having a sharp knife edge 28 as the main blade 16. In the embodiment shown, the knife edge 28 is formed integrally with the knife carrier 27 but can also be provided as a separate component. The knife edge 28 is preferably provided with a type of serrated edge. However, other customary knife edges and types of grinding are also possible. The knife carrier 27 is firmly connected to pivot levers 29, 30 at both free ends such that when the adjusting drive 23 initiates the pivoting movement, the knife carrier 27 is moved together with the knife edge 28 about the pivot point D.

As described above, the main blade 16 is firmly connected to the pivot mechanism 22 and is pivotable therewith about the pivot point D. A secondary blade 31, which is movable relative to the main blade 16, is assigned to the main blade 16 for incising the surface layer, wherein an adjusting drive 32, which is connected to the evaluation and control unit 20 by a signal line 21, is assigned to the secondary blade 31 for executing the incising movement depending on the previously determined fish fillet size. The secondary blade 31 is used to execute a preparatory cut for the main blade 16, the so-called incision, when the fish fillet 11 strikes in the region of the separating arrangement. For this purpose, the secondary blade 31 is configured to be movable out of a retracted waiting position, in which the secondary blade 31 lies in transport direction T downstream of the main blade 16 (or at least does not protrude beyond the main blade 16 contrary to the transport direction T) into an incising position, in which the secondary blade 31 protrudes beyond the main blade 16 contrary to the transport direction T, and back again.

The secondary blade 31 can be explained in detail, again with reference to FIG. 5. In the example shown, the secondary blade 31 is arranged between the knife carrier 27 and a clamping element 33 in such a manner that a linear adjusting movement of the secondary blade 31 is ensured relative to the main blade 16. The adjusting drive 32 comprises two adjusting elements 34, 35 for tilt-free movement of the secondary blade 31. One adjusting element 34, 35 is assigned to each of the two pivot levers 29, 30 for synchronous operation of the secondary blade 31. The adjusting elements 34, 35 can be configured, for example, as pneumatic cylinders. Naturally, the secondary blade 31 and the adjusting drive 32 can be configured in a different customary manner. The secondary blade 31 can be controlled selectively and automatically via the signal line 21 depending on the previously determined fish fillet size.

As already described, a drive means is assigned to the feeding device 12, said drive means being connected to the evaluation and control unit 20 by signal line 21 for transmitting the transport speed of the fish fillets 11 in transport direction T. Optionally, an adjusting drive (not illustrated) can also be assigned to the pressing element 17, said drive being connected via a signal line 21 to the evaluation and control unit 20. The adjusting drive is used in particular for adjusting the distance from the driver roller 15 depending on the previously determined fish fillet size. All adjusting drives 23, 32 and/or drive means can be activated and/or controlled independently of each other by the evaluation and control unit 20. This means that the individual components, e.g. the main blade 16 and the secondary blade 31, can be controlled, and thus moved, separately from each other and in particular also overlaid.

The principle of the method according to the invention is explained in greater detail below based on the drawing:

The fish fillets 11 are transported lying skin side down and tail end first in transport direction T by a feeding device 12 in the region of a separating arrangement 13. Removal of the skin layer from the actual fish fillet 11 takes place in the region of the separating arrangement 13, in that the fish fillets 11 are fed lying flat between a rotationally driven driver roller 15 and a pressing element 17 to a main blade 16. In other words, the pressing element 17 presses each fish fillet 11 against the conveying surface F of the driver roller 15 which transports the fish fillet 11 in the direction of the main blade 16. The main blade 16 inserts into the fish fillet 11 on the front face (at the tail end), the main blade 16 penetrating deeper and deeper into the fish fillet 11 and approximately parallel to the transport plane E, due to continuous transport of the fish fillet 11 in transport direction T, until the separating incision is complete. The removed surface layer is dispatched downwards by way of a cutting gap S formed between the main blade 16 and the driver roller 15 while the fish fillet 11 freed from the surface layer is transferred to a dispatching device 14 which dispatches said fish fillet 11 freed from the surface layer.

According to the invention, the size of the fish fillets 11 to be processed is determined in the region of the feeding device 12 and the size of the cutting gap S between the main blade 16 and the driver roller 15 is automatically adjusted depending on the previously determined fish fillet size. In other words, the product is determined in respect of its size before every removal process. This information and data are then used for individual and automatic control of the main blade 16 in order to adjust the optimum cutting gap S for each individual fish fillet 11.

The fish fillets 11 are preferably incised by a secondary blade 31 before striking the main blade 16, the incising, that is the length or depth of the incision, being automatically adjusted by the secondary blade 31 depending on the previously determined fish fillet size. When a fish fillet 11 is transported into the region of the driver roller 15, in addition to adjusting the size of the cutting gap S depending on the fish fillet size, incising takes place in that the secondary blade 31 is brought into its working position. For this purpose, the secondary blade 31 is moved contrary to the transport direction T protruding beyond the main blade 16 such that the fish fillet 11 initially strikes the secondary blade 31 which then executes the incision. As soon as the incision has been made, the secondary blade 31 can be retracted into its waiting position so that the main blade 16 can carry out the actual removal process. The length of time the secondary blade 31 remains in the fish fillet 11 depends, among other things, on the size of the fish fillet. The incision phase may last longer for larger fish fillets 11 than for small fish fillets 11. Accordingly, the secondary blade 31 is controlled depending on the fish fillet size. Adjusting or controlling the size of the cutting gap S and the position of the secondary blade 31 relative to the main blade 16 (movement between waiting position and working position) is controlled by an evaluation and control unit 20 depending on the previously determined fish fillet size and the transport speed of the fish fillets 11.

Optionally, adjustment of the distance between the pressing element 17 and the driver roller 15 can also take place automatically, preferably depending on the previously determined fish fillet size. The individual adjusting movements for changing the size of the cutting gap S and/or for relative movement of the secondary blade 31 with respect to the main blade 16 and/or for changing the distance between the pressing element 17 and the driver roller 15 can be performed independently of each other. This means that the main blade 16 and the secondary blade 31 can be brought into the optimum position in each case, coordinated with each other or completely independently of each other. The same applies to changing the distance between the pressing element 17 and the driver roller 15. In particular, the adjusting movements can also be executed overlaying each other.

It is particularly advantageous if the method described above is carried out with the apparatus 10 described even further above.

The invention claimed is:

1. An apparatus for removing a surface layer including the skin from fish fillets, comprising a feeding device for feeding the fish fillets lying skin side down tail end first in transport direction T in the region of a separating arrangement, a dispatching device for dispatching the fish fillets freed from the surface layer, and the separating arrangement, wherein the separating arrangement comprises a rotationally driven driver roller arranged downstream of the feeding device (12) and upstream of the dispatching device in the transport direction T of the fish fillets, said driver roller having a drive direction A synchronous with the transport direction T, a main blade arranged in the region of the driver roller for removing the surface layer and a pressing element active in the region of the main blade for pressing the fish fillets onto the textured conveying surface F of the driver roller, wherein the main blade is arranged at a distance from the driver roller to form a cutting gap S and is designed to be deflectable relative to the driver roller, characterized in that the apparatus has a measuring arrangement, said measuring arrangement comprising at least one detection element, which is arranged in the region of the feeding device and is designed and configured to determine size-relevant data of the fish fillets, and an evaluation and control unit, the evaluation and control unit being connected by signal lines to each detection element and to the main blade for automatically controlling the size of the cutting gap S between the main blade and the driver roller depending on the previously determined fish fillet size.

2. The apparatus according to claim 1, characterized in that the main blade is arranged on a pivot mechanism which is designed to be pivotable about a pivot point D for changing the size of the cutting gap S, wherein an adjusting drive for executing the pivoting movement, two abutments for limiting the pivoting movement in both pivoting directions and a retaining element, whose retaining force acts counter to the activation direction of the adjusting drive, are assigned to the pivot mechanism, and in that the adjusting drive is connected to the evaluation and control unit by a signal line.

3. The apparatus according to claim 1, characterized in that the main blade is firmly connected to the pivot mechanism and is pivotable therewith about the pivot point D, and in that a secondary blade, which is movable relative to the main blade, is assigned to the main blade for incising the surface layer, wherein an adjusting drive, which is connected to the evaluation and control unit by a signal line, is assigned to the secondary blade for executing the incision movement depending on the previously determined fish fillet size.

4. The apparatus according to claim 3, characterized in that the adjusting drives can be activated and/or controlled independently of each other by the evaluation and control unit.

5. The apparatus according to claim 1, characterized in that a drive means is assigned to the feeding device, said drive means being connected to the evaluation and control unit by a signal line for transmitting the transport speed of the fish fillet in transport direction T.

6. The apparatus according to claim 1, characterized in that an adjusting drive, which is connected to the evaluation and control unit by a signal line, is assigned to the pressing element to adjust the distance to the driver roller depending on the previously determined fish fillet size.

7. A method for removing a surface layer including the skin from fish fillets, comprising the steps:
feeding of the fish fillets lying skin side down, tail end first in transport direction T by a feeding device in the region of a separating arrangement,
removal of the surface layer of the fish fillets from the same by the separating arrangement, in that the fish fillets are fed lying flat between a rotationally driven driver roller and a pressing element to a main blade, wherein the removed surface layer is dispatched downwards by way of a cutting gap S formed between the main blade and the driver roller while the fish fillet freed from the surface layer is transferred to a dispatching device, and
dispatching of the fish fillets freed from the surface layer by the dispatching device,
characterized in that the size of the fish fillets to be processed is determined in the region of the feeding device and the size of the cutting gap S between the main blade and the driver roller is automatically adjusted depending on the previously determined fish fillet size.

8. The method according to claim 7, characterized in that the fish fillets are incised by a secondary blade before striking the main blade, wherein the incising, that is the length or depth of the incision, is automatically adjusted by the secondary blade depending on the previously determined fish fillet size.

9. The method according to claim 7, characterized in that an evaluation and control unit controls the size of the cutting gap S and the position of the secondary blade relative to the main blade depending on the previously determined fish fillet size and the transport speed of the fish fillets.

10. The method according to claim 7, characterized in that the distance of the pressing element from the driver roller is automatically adjusted depending on the previously determined fish fillet size.

11. The method according to claim 7, characterized in that the individual adjusting movements for changing the size of the cutting gap S and/or for relative movement of the secondary blade with respect to the main blade and/or for changing the distance between the pressing element and the driver roller can be performed independently of each other.

12. The method according to claim 7, characterized in that said method is carried out with an apparatus according to claim 1.

* * * * *